(12) United States Patent
Oyman

(10) Patent No.: US 10,523,982 B2
(45) Date of Patent: *Dec. 31, 2019

(54) MULTIMEDIA ADAPTATION BASED ON VIDEO ORIENTATION

(71) Applicant: INTEL CORPORATION, Santa Clara, CA (US)

(72) Inventor: Ozgur Oyman, Palo Alto, CA (US)

(73) Assignee: INTEL CORPORATION, Santa Clara, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/685,812

(22) Filed: Aug. 24, 2017

(65) Prior Publication Data

US 2017/0353743 A1    Dec. 7, 2017

Related U.S. Application Data

(63) Continuation of application No. 14/125,595, filed as application No. PCT/US2013/067048 on Oct. 28, 2013, now Pat. No. 9,762,938.

(Continued)

(51) Int. Cl.
   *G06F 15/16*     (2006.01)
   *H04N 21/2381*   (2011.01)
   (Continued)

(52) U.S. Cl.
   CPC ....... *H04N 21/2381* (2013.01); *H04N 21/239* (2013.01); *H04N 21/2343* (2013.01);
   (Continued)

(58) Field of Classification Search
   CPC ......... H04N 21/2343; H04N 21/41407; H04N 21/25825; H04L 67/04
   See application file for complete search history.

(56) References Cited

U.S. PATENT DOCUMENTS 7,065,641 B2   6/2006  Schelling
8,595,186 B1   11/2013 Mandyam et al.
(Continued)

FOREIGN PATENT DOCUMENTS

CN   101300810 A   11/2008
CN   102361492 A   2/2012
(Continued)

OTHER PUBLICATIONS

Telefon AB LM Ericsson; "Video Orientation;" 3GPP Tdoc S4-120684; (May 21-25, 2012); 6 pages; TSG-SA4#69 Meeting, Erlangen, Germany; (Agenda 9).

(Continued)

*Primary Examiner* — Chirag R Patel
*Assistant Examiner* — Rachel J Hackenberg
(74) *Attorney, Agent, or Firm* — Thorpe North & Western

(57) ABSTRACT

Technology for a mobile terminal (MT) operable to provide an orientation-aware processing capability is disclosed. The MT can determine video orientation capability information for the MT. The MT can process the video orientation capability information for transmission to a server via a packet switched streaming service (PSS) device capability exchange signaling between the MT and the server. The MT can access segments from the server via the PSS based on an orientation of the MT and the video orientation capability information for the MT.

28 Claims, 9 Drawing Sheets

Related U.S. Application Data

(60) Provisional application No. 61/753,914, filed on Jan. 17, 2013, provisional application No. 61/719,241, filed on Oct. 26, 2012.

(51) Int. Cl.

| | |
|---|---|
| *H04N 21/2343* | (2011.01) |
| *H04N 21/258* | (2011.01) |
| *H04N 21/414* | (2011.01) |
| *H04N 21/422* | (2011.01) |
| *H04N 21/643* | (2011.01) |
| *H04N 21/658* | (2011.01) |
| *H04N 21/845* | (2011.01) |
| *H04N 21/854* | (2011.01) |
| *H04N 21/239* | (2011.01) |
| *H04N 21/2743* | (2011.01) |
| *H04N 21/4223* | (2011.01) |
| *H04N 21/437* | (2011.01) |
| *H04N 21/45* | (2011.01) |
| *H04N 21/61* | (2011.01) |
| *H04N 21/6437* | (2011.01) |

(52) U.S. Cl.
CPC . *H04N 21/23439* (2013.01); *H04N 21/25808* (2013.01); *H04N 21/25833* (2013.01); *H04N 21/2743* (2013.01); *H04N 21/41407* (2013.01); *H04N 21/422* (2013.01); *H04N 21/4223* (2013.01); *H04N 21/437* (2013.01); *H04N 21/4532* (2013.01); *H04N 21/6125* (2013.01); *H04N 21/6175* (2013.01); *H04N 21/6437* (2013.01); *H04N 21/64322* (2013.01); *H04N 21/6582* (2013.01); *H04N 21/8456* (2013.01); *H04N 21/85406* (2013.01); *Y02D 70/126* (2018.01); *Y02D 70/14* (2018.01)

(56) References Cited

U.S. PATENT DOCUMENTS

| | | |
|---|---|---|
| 2006/0010226 A1 | 1/2006 | Hurtta et al. |
| 2006/0026513 A1 | 2/2006 | Eschbach et al. |
| 2007/0010286 A1 | 1/2007 | Luke et al. |
| 2007/0011256 A1 | 1/2007 | Klein |
| 2008/0270528 A1 | 10/2008 | Girardeau et al. |
| 2009/0319181 A1 | 12/2009 | Khosravy et al. |
| 2010/0060604 A1 | 3/2010 | Zwart et al. |
| 2010/0106770 A1 | 4/2010 | Taylor et al. |
| 2010/0130213 A1 | 5/2010 | Vendrow et al. |
| 2010/0262711 A1 | 10/2010 | Bouazizi |
| 2011/0228112 A1 | 9/2011 | Kaheel et al. |
| 2011/0246659 A1* | 10/2011 | Bouazizi ............ H04N 21/2343 709/231 |
| 2011/0276712 A1 | 11/2011 | Narula et al. |
| 2011/0298982 A1 | 12/2011 | Kobayashi |
| 2011/0320615 A1* | 12/2011 | Skog .................. H04M 1/7253 709/227 |
| 2012/0020413 A1 | 1/2012 | Chen et al. |
| 2012/0023249 A1 | 1/2012 | Chen et al. |
| 2012/0050451 A1 | 3/2012 | Yan |
| 2012/0079276 A1 | 3/2012 | Evans et al. |
| 2012/0086819 A1 | 4/2012 | Wilson et al. |
| 2012/0106643 A1 | 5/2012 | Fujimoto |
| 2012/0154386 A1* | 6/2012 | Nagara ................. G02B 27/26 345/419 |
| 2012/0155398 A1 | 6/2012 | Oyman et al. |
| 2012/0188882 A1 | 7/2012 | Wilkinson et al. |
| 2012/0195196 A1 | 8/2012 | Ghai et al. |
| 2012/0203861 A1 | 8/2012 | Flack et al. |
| 2012/0233345 A1 | 9/2012 | Hannuksela |
| 2012/0278495 A1 | 11/2012 | Furbeck |
| 2012/0306722 A1 | 12/2012 | Kim et al. |
| 2013/0060888 A1 | 3/2013 | Lee et al. |
| 2013/0342762 A1* | 12/2013 | Wang .................... H04N 19/70 348/583 |
| 2014/0019635 A1 | 1/2014 | Reznik et al. |
| 2014/0040959 A1 | 2/2014 | Oyman |

FOREIGN PATENT DOCUMENTS

| | | | | |
|---|---|---|---|---|
| CN | 102577309 A | 7/2012 | | |
| EP | 1716696 B1 | 7/2004 | | |
| EP | 2442562 A1 | 4/2012 | | |
| EP | 2466449 A2 | 6/2012 | | |
| EP | 1716696 B1 * | 9/2012 | .......... | G06F 1/1626 |
| JP | 2003319365 A | 11/2003 | | |
| JP | 2004240878 A | 8/2004 | | |
| JP | 2005049834 A | 2/2005 | | |
| JP | 2005148326 A | 6/2005 | | |
| JP | 2008079228 A | 4/2008 | | |
| JP | 2012/141570 A | 7/2012 | | |
| KR | 10-0631601 B1 | 10/2006 | | |
| TW | 201322743 A | 6/2013 | | |
| WO | WO 2000/079406 A1 | 12/2000 | | |
| WO | WO 2005069593 A1 | 7/2005 | | |
| WO | WO 2007/026237 A1 | 3/2007 | | |
| WO | WO 2007/262137 A1 | 3/2007 | | |
| WO | WO-2007026237 A1 * | 3/2007 | ......... | G06F 17/2247 |
| WO | WO 2009/055938 A1 | 5/2009 | | |
| WO | WO 2010/099511 A1 | 9/2010 | | |
| WO | WO 2011039617 A1 | 4/2011 | | |
| WO | WO 2012046487 A1 | 4/2012 | | |
| WO | WO 2013/019267 A1 | 2/2013 | | |
| WO | WO 2013/033565 A1 | 3/2013 | | |
| WO | WO 2014/066885 A1 | 5/2014 | | |
| WO | WO 2014/066887 A1 | 5/2014 | | |

OTHER PUBLICATIONS

3GPP TS 26.234; "Transparent end-to-end Packet Switched Streaming Service (PSS), Protocols and codecs"; Technical Specification Group Services and System Aspects; (Sep. 2012); 172 pages; V11.1.0, Release 11.

3GPP TS 26.237; "IP Multimedia Subsystem (IMS) based Packet Switch Streaming (PSS) and Multimedia Broadcast/Multicast Service (MBMS) User Service, Protocols"; Technical Specification Group Services and System Aspects; (Jun. 2012); 142 pages; V 11.0.0, Release 11.

3GPP TS 26.244; "Transparent end-to-end Packet Switched Streaming Service (PSS)"; 3GPP file format (3GP), Technical Specification Group Services and System Aspects; (Sep. 2012); 60 pages; V11.1.0, Release 11.

3GPP TS 26.247; "Transparent end-to-end Packet switched Streaming Service (PSS); Progressive Download and Dynamic Adaptive Streaming over HTTP (3GP-DASH)"; Technical Specification Group Services and System Aspects; (Sep. 2012); 112 pages; V 11.0.0, Release 11.

Ericsson et al.; "On Coordination of Video Orientation"; 3GPP TSG S4-121503 CR 0237; (Nov. 2012); 24 pages; SA4 Meeting 71, Bratislava, Slovakia; V 11.5.1.

Gellens; "The 'Codecs' and 'Profiles' Parameters for 'Bucket' Media Types"; RFC 6381; (Aug. 2011); 14 pages; IETF.

Intel; "Capability Exchange Signaling of Supported Device Orientation Modes"; 3GPP TSG S4-130256 CR 0204; (Jan. 2013); 31 pages; SA4 Meeting 72, Valencia, Spain; V 11.1.0.

ISO/IEC 14496-12; "Information Technology-Coding of Audio-Visual Objects-Part 12: ISO Base Media File Format"; (Apr. 2, 2005); 94 pages; Second edition.

Open Mobile Alliance; "User Agent Profile"; (Feb. 6, 2006); 46 pages; Approved Version 2.0.

Oyman; "Methods for Capability Signaling and Multimedia Adaptation based on Device Orientation"; Disclosure #95580; (Aug. 2, 2012); 11 pages.

Research in Motion et al.; "Storage of CVO Data in the 3GPP File Format"; 3GPP TSG S4-130267 CR 0049; (Jan. 2013); 8 pages; SA Meeting 72, Valencia, Spain; V 11.1.0.

(56) References Cited

OTHER PUBLICATIONS

Samsung Electronics Co. Ltd; "Mid-call Control of Far-end Video Orientation & Size"; 3GPP TSG S4-120718; (May 2012); 2 pages; SA4 Tdoc Meeting #69.

Telefon AB LM Ericsson et al.; "New Work Item Description on control of video orientation"; 3GPP TSG S4-120850; (May 2012); 6 pages; SA WG4 Meeting #69.

W3C; "Composite Capability/Preference Profiles (CC/PP): Structure and Vocabularies 1.0"; W3C Recommendation; (Jan. 15, 2004); 36 pages.

W3C; "RDF Vocabulary Description Language 1.0: RDF Schema"; W3C Recommendation; (Feb. 10, 2004); 12 pages.

3GPP TS 26.114; "$3^{rd}$ Generation Partnership Project; Technical Specification Group Services and System Aspects; IP Multimedia Subsystem (IMS); Multimedia Telephony; Media Handling and Interaction;" (Sep. 2012); 269 pages; V11.5.0 (Release 11).

3GPP TS 26.234; "$3^{rd}$ Generation Partnership Project; Technical Specification Group Services and System Aspects; Transparent End-to-End Packet-Switched Streaming Service (PSS); Protocols and Codecs;" (Jun. 2010); 182 pages; V9.3.0 (Release 9).

Adzic et al.; "Optimized Adaptive HTTP Streaming for Mobile Devices;" Proceedings of The International Society for Optical Engineering; SPIE Optics & Photonics, Applications of Digital Image Processing XXXIV; (Sep. 2011); vol. 8185; <doi: 10.1117/12.895546 >.

Fielding et al.; "RFC 2616—Hypertext Transfer Protocol—HTTP/1.1;" Internet Engineering Task Force; (Jun. 1999); 176 pages; Standards Track; The Internet Society.

Handley et al; "RFC 4566—SDP: Session Description Protocol;" Internet Engineering Task Force; (Jun. 2006); 46 pages; Standards Track; The Internet Society.

Rosenberg et al.; "RFC 3261—SIP: Session Initiation Protocol;" Internet Engineering Task Force; (Jun. 2002); 270 pages; Standards Track; The Internet Society.

\* cited by examiner

MULTIMEDIA ADAPTATION BASED ON VIDEO ORIENTATION

RELATED APPLICATIONS

This application is a continuation of U.S. patent application Ser. No. 14/125,595, filed Dec. 12, 2013 which is a 371 nationalization of PCT/US2013/067048 filed Oct. 28, 2013, which claims the benefit of U.S. Provisional Patent Application Ser. No. 61/719,241, filed Oct. 26, 2012, and U.S. Provisional Patent Application Ser. No. 61/753,914, filed Jan. 17, 2013, all of which are hereby incorporated by reference in their entirety for all purposes

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

The wireless device can be used receive multimedia delivery of Internet video using various protocols, such as hypertext transfer protocol (HTTP) streaming. A protocol to provide HTTP-based delivery of video streaming can include dynamic adaptive streaming over HTTP (DASH).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
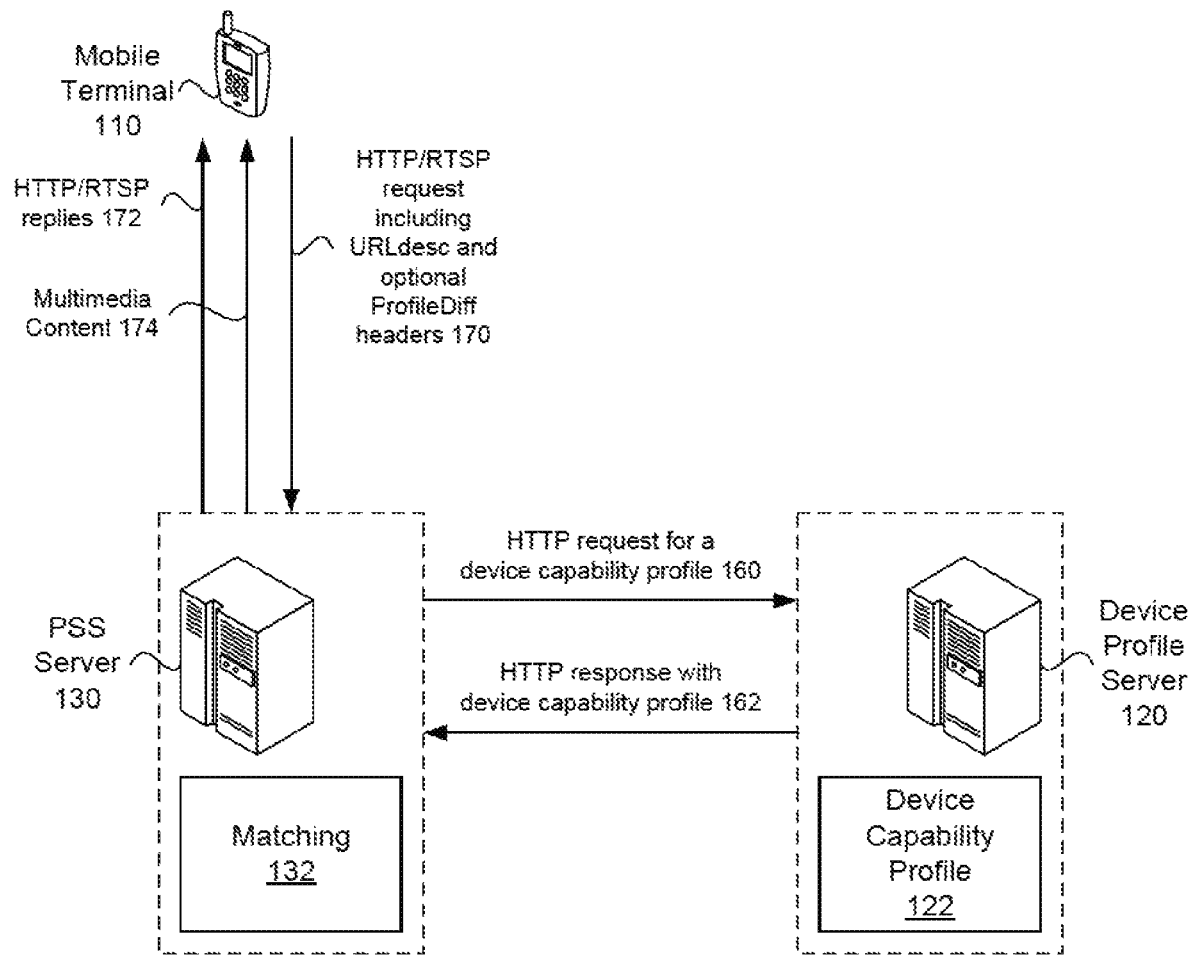
FIG. 1 illustrates a diagram of functional components in a packet switched streaming service (PSS) capability exchange in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The growth of multimedia services, including streaming and conversational services, is one of the drivers of the evolution to new mobile broadband technologies and standards. With a high consumer demand for multimedia services coupled with developments in media compression and wireless network infrastructures, enhancing the multimedia service capabilities of cellular and mobile broadband systems is desirable, where the multimedia service capabilities can be used to deliver a high quality of experience (QoE) to the consumers ensuring ubiquitous access to video content and services from any location, at any time, with any device and technology. Supporting various mobile devices and providing media handling procedures and session management protocols optimized for various device classes and capabilities can be used to enable delivery of multimedia content with high QoE in a ubiquitous fashion.

With the introduction of orientation sensors in mobile devices used in real-time video communication, the display content can be rotated to be aligned with the device orientation. In example, the orientation sensor can detect the device orientation by measuring the gravity field. Other types of orientation sensors may also be used. The device orientation can then be used in applications to adjust device functions according to orientation. For instance, the device can rotate the user interface or video orientation to either a portrait or landscape mode based on device orientation.

Because some client devices contain an orientation sensor, the content or service provider may provide different encoded versions of the content optimized for different device orientations or the content/service provider may capture or transcode the content during content capture (e.g., on-the-fly) in order to deliver an optimized experience. Signaling from the user equipment (UE) to the network of the orientation sensor capabilities and/or the current device orientation can provide opportunities to adapt the content on the network side to deliver a high quality client experience. Multimedia adaptation based device and/or video orientation adaptation can apply to both two-dimensional (2D) and three-dimensional (3D) video applications. For a 2D video example, portrait or landscape video views and/or different viewing angles may be adapted based on device orientation. For a 3D video example, the different viewing angles and depth information may be adapted based on device orientation.

Capability exchange signaling can be an important functionality in third generation partnership project's (3GPP's) packet switched streaming service (PSS) (as described in 3GPP technical specification (TS) 26.234 V11.1.0 (2012-09)), dynamic adaptive streaming over HTTP (DASH) (as described in 3GPP technical specification (TS) 26.247 V11.0.0 (2012-09)), and integrated multimedia subsystem (IMS) based PSS and multimedia broadcast and multicast service (MBMS) (abbreviated as IMS_PSS_MBMS, as described in 3GPP technical specification (TS) 26.237 V11.0.0 (2012-06)). Capability exchange enables PSS, DASH, and IMS_PSS_MBMS servers to provide a wide range of devices with content suitable for the particular device in question. To facilitate server-side content negotiation for streaming, the PSS or IMS_PSS_MBMS server may have access to a description of the specific capabilities of the mobile terminal (MT) via a device capability description. The device capability description can contain a number of attributes. For DASH, the attributes of device capability signaling can include the following parameters: A pre-decoder buffer size, an initial buffering period, a decoder capability, display properties (e.g., screen size, resolution, or bit depth), a streaming method (e.g., real-time streaming protocol (RTSP) or HTTP) adaptation support, QoE support, extended real-time transport protocol (RTP) control protocol (RTCP) reporting support, and fast content switching support, as well as supported RTP profiles and session description protocol (SDP) attributes. During the set-up of a streaming session, a server can use the description to provide the mobile terminal with a correct type of multimedia content. The servers can use information about the capabilities of the mobile terminal to determine which stream to provision to the connecting terminal. For instance, the server can compare the requirements on the mobile terminal for multiple available variants of a stream with the actual capabilities of the connecting terminal to determine a best-suited stream for that particular mobile terminal. Capability exchange also allows for delivery an optimized session description protocol (SDP) file to a client terminal (e.g., mobile terminal) for a PSS or IMS_PSS_MBMS session or an optimized media presentation description (MPD) metadata file to the client terminal for a DASH session.

FIG. 1 illustrates can example of how capability exchange can be performed for PSS services. In a simplest illustration, the mobile terminal 110 (or client device or client terminal) can informs the PSS server 130 about the MT's identity so that the PSS server can retrieve a device capability profile from a device profile server 120, which can store the device capability profile 122 for the mobile terminal. The MT can send a HTTP and/or RTSP request to the PSS server 170. The HTTP and/or RTSP request can include a uniform resource locator (URL) descriptor (URLdesc) and/or a profile difference (profileDiff) header. The PSS server can send a HTTP request to the device profile server for a device capability profile for the MT 160. The device profile server can send a HTTP response to the PSS server with device capability profile for the MT 162. The PSS server can match or copy the device capability profile 132. The PSS server can send HTTP and/or RTSP replies 172 and multimedia content 174 to the MT based on the device capability profile for the MT. In an example, a terminal manufacturer or a software vendor can maintain a device profile server to provide device capability profiles for the manufacturer or vendor's products. In another example, an operator can manage a device profile server for the operator's subscribers, which can allow the subscriber to make user specific updates to the subscribers profiles. The device profile server can provide device capability profiles to the PSS server on request. In certain scenarios, the mobile terminal may supplement the identity signaling with extra attributes or overrides for attributes already defined in the MT's device capability profile, which can be referred to as Profdiff (ProfDiff or profileDiff). The Profdiff can temporarily allow for adjusting the attributes of the device capability profile. In an example, such a temporary adjustment may be triggered by user preferences (e.g., if the user for a particular session likes to receive mono sound even though the mobile terminal is capable of stereo).

Figure 2:
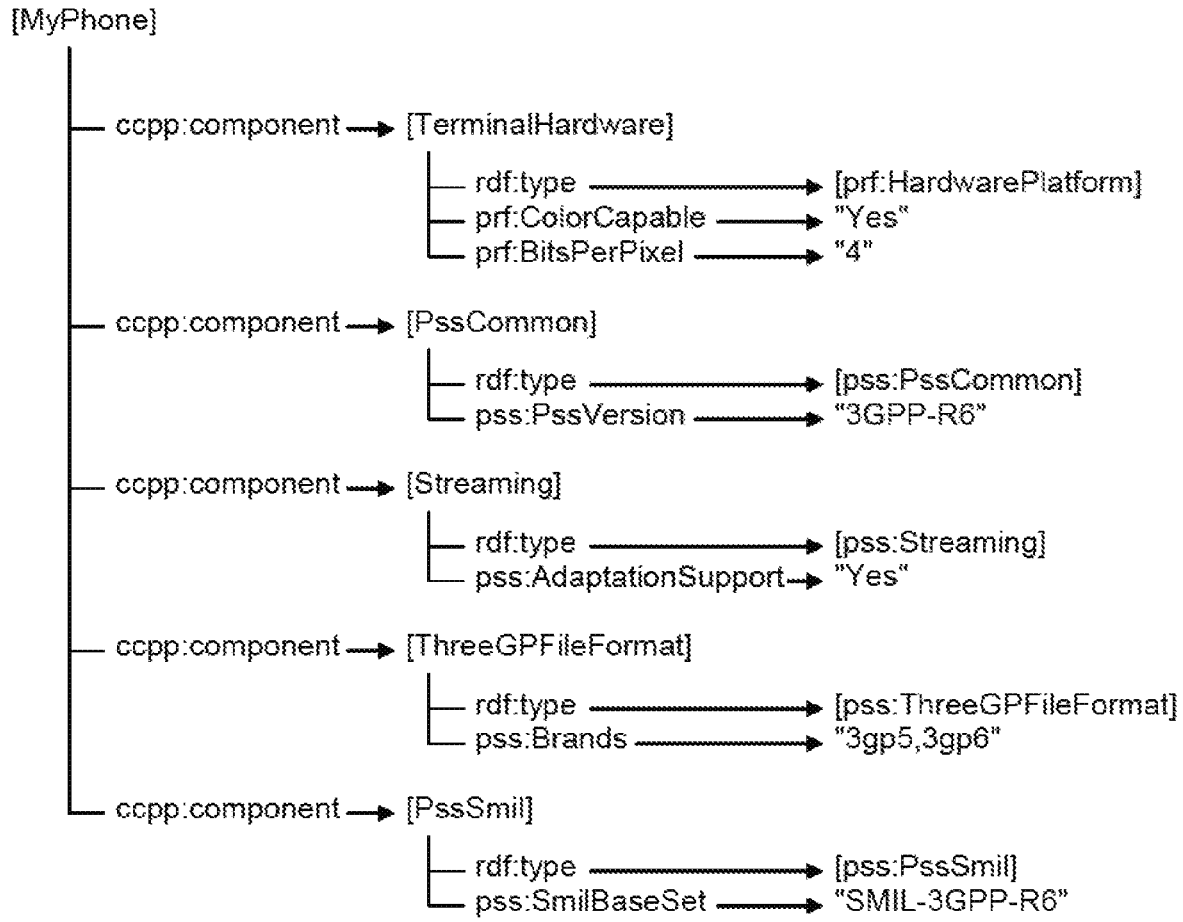
FIG. 2 illustrates an example device capability profile for a packet switched streaming service (PSS) and an integrated multimedia subsystem (IMS) based PSS and multimedia broadcast and multicast service (MBMS) (IMS_PSS_MBMS) services in accordance with an example.

A user agent profile (UAProf) specification can provide protocols for capturing capability and preference information for wireless devices. This capability and preference information can be used by content providers to produce content in an appropriate format for the specific device. The UAProf can be related to the composite capabilities/preference profiles (CC/PP) specification created by the World Wide Web (WWW) consortium. A device capability profile can be a resource description framework (RDF) document that follows the structure of an CC/PP framework and an CC/PP application UAProf Attributes can be used to specify device capabilities and preferences. A set of attribute names, permissible values, and semantics can constitute a CC/PP vocabulary, which can be defined by an RDF schema. For PSS and IMS_PSS_MBMS services, the UAProf vocabulary can be reused and an additional service-specific vocabulary can be defined. FIG. 2 provides an example device capability profile for the PSS and IMS_PSS_MBMS services, which can define various CC/PP components (ccpp: component), such as TerminalHardware, PSSCommon, Streaming, ThreeGPFileFormat (3GP), or PssSmil.

The technology (e.g., servers, client devices or terminal, mobile terminals, methods, computer circuitry, and systems) as described herein can provide multimedia adaptation based on the device capability exchange signaling of orientation sensor capabilities of the mobile terminal or client device.

In an example, at least two-step of a process can be performed. For instance, the client device can signal to the server about whether the client device has an orientation sensor and what video orientation (e.g., page orientation) states the client device supports (e.g., portrait, landscape, or seascape) (see 280 of FIGS. 6 and 8). Video orientation can be a new set of device capability attributes for the PSS vocabulary, which can be applicable to IMS_PSS_MBMS and DASH sessions. The device capability attributes on the device orientation capabilities of the client device (e.g., UE) can include a list of device orientation positions that provides an indication of video display device orientation modes, video capture device orientation modes, video display device orientation angles, video capture device orientation angles, a boolean-valued indicator having values indicating whether the UE is responsive to changes in orientation, default device orientation for rendering and display, default device orientation for capture, number of equally-spaced angular granularity levels in a 90 degree interval at which the orientation sensor is configured to detect orientation changes during both video capture and display, number of cameras associated with the UE, or horizontal mirroring support. In addition, the client device may also signal the current device orientation via ProfDiff signaling by temporarily overriding the default device orientation attribute, which can be another attribute added to the device capability exchange signaling vocabulary.

Figure 6:
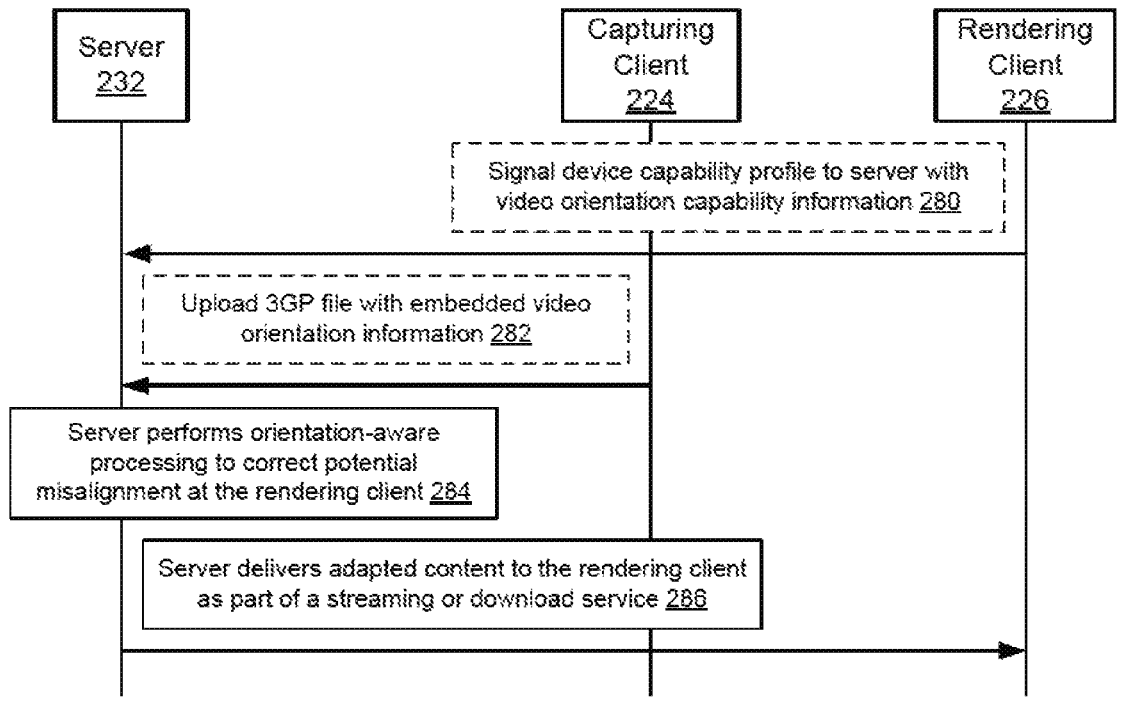
FIG. 6 illustrates an example server-client interaction using orientation-aware multimedia adaptation based on reception of content with embedded video orientation information in accordance with an example.
Figure 8:
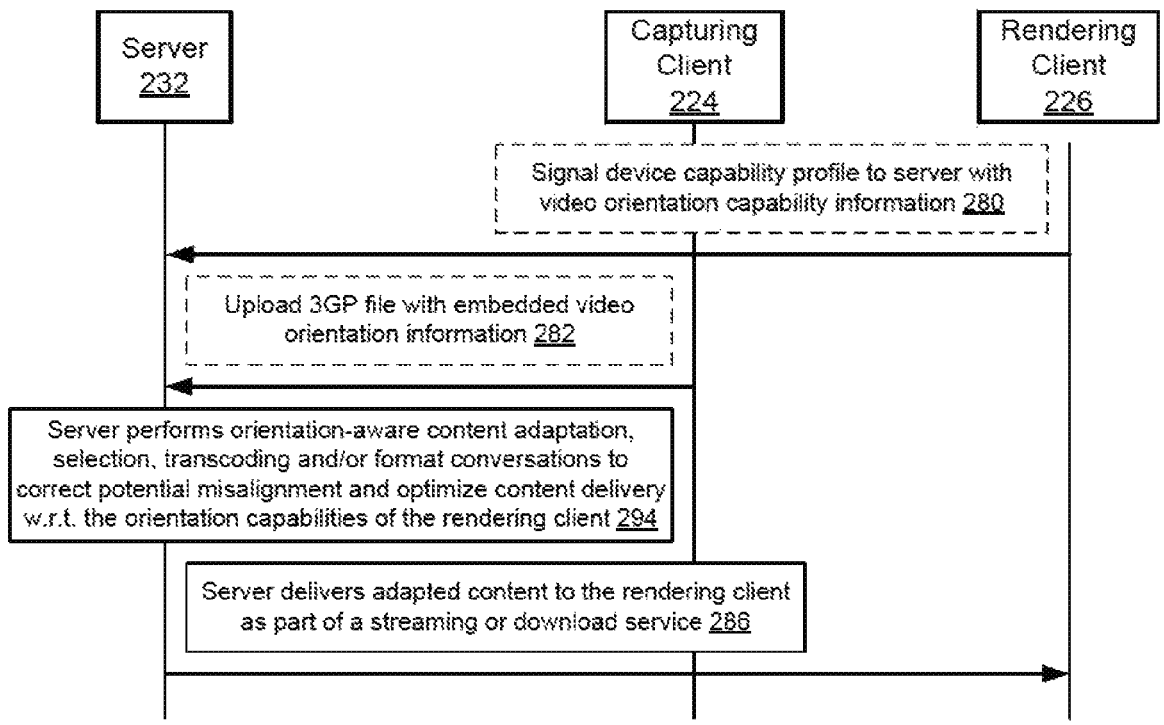
FIG. 8 illustrates an example server-client interaction using device orientation-aware multimedia adaptation based on reception of content with embedded video orientation information in accordance with an example.

In another step, the server can consider the orientation sensor support signal from the client device and provide different encoded versions of the content in formats best suited for the different possible device orientations (see 284 and 286 of FIG. 6; or 294 and 286 of FIG. 8). At the session management level, access to the device orientation information and/or orientation capabilities of the client can also allow the server to deliver an optimized session description protocol (SDP) for RTSP/RTP streaming in a PSS or IMS_PSS_MBMS session or an optimized media presentation description (MPD) for dynamic adaptive streaming over HTTP (DASH) in a DASH session. Moreover, if the server also controls the capture processes for the content production and/or preparation, the server can instruct a camera unit (e.g., another client device) to capture and compress multiple copies of the same content best suited for the different possible device orientations (see 282 of FIGS. 6 and 8). The server may also dynamically perform transcoding and/or format conversions on-the-fly in order to best match the content to the orientation capabilities of the client device.

The technology described herein can be applied for both 2D and 3D video applications. Different streaming paradigms (e.g., PSS, DASH, and IMS_PSS_MBMS), can use different multimedia adaptation methods and processes, which is explained in greater detail below.

Figure 3:
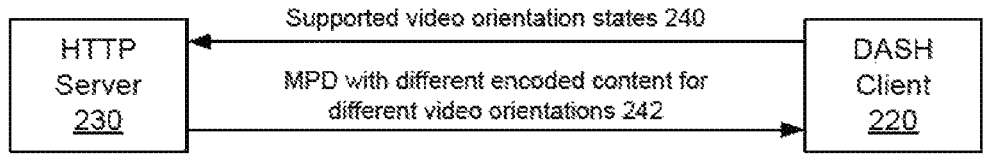
FIG. 3 illustrates an example dynamic adaptive streaming over hypertext transfer protocol (HTTP) based (DASH-based) streaming with adaptation for video orientation in accordance with an example.

A service can use a pull-based streaming process or a push-based streaming process. DASH provides an example of pull-based streaming. For a DASH session, a HTTP server 230 provides the content optimized for different device orientations to a DASH client 220, as illustrated in FIG. 3. The HTTP server may use the device capability exchange signaling from the DASH client describing the various supported device orientation states 240. The device capability signaling from the DASH client may also include a default device orientation attribute, indicating the device orientation in the absence of any further signaling from the DASH client. The set of device orientations and corresponding content information can be signaled to the DASH client in the media presentation description (MPD) metadata file 242 with different encoded content for different device orientations, which server-client interaction is depicted in FIG. 3. The DASH client player can then track the current device orientation and request the corresponding versions of the content optimized for the current device orientation. Moreover, when retrieving an MPD with HTTP, the DASH client may include device orientation information in a GET request, including any temporary adjustments to the device orientation based on ProfDiff (e.g., current device orientation may be different from the default device orientation). Using this DASH device capability exchange signaling process, the HTTP server can deliver an optimized MPD to the DASH client (e.g., UE).

Figure 4:
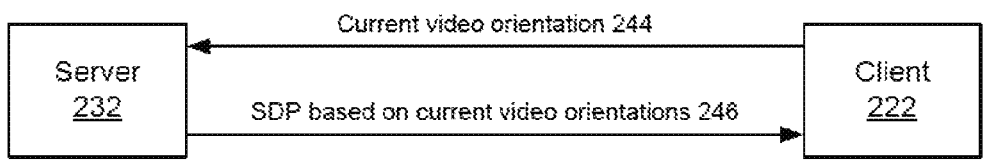
FIG. 4 illustrates an example real-time streaming protocol-based (RTSP-based) streaming with adaptation for video orientation in accordance with an example.

The PSS services based on the real-time streaming protocol (RTSP) and the IMS_PSS_MBMS service based on the session initiation protocol (SIP) provide examples of push-based streaming. For the PSS or IMS_PSS_MBMS service, the server 232 can receive the current device orientation information 244 from the client 222 and adapt the content based on device orientation, as illustrated in FIG. 4. For instance, the server can select a most suited content version among stored content versions or dynamically transcodes the content based on the current device orientation and stream the content to the client 246, which server-client interaction is depicted in FIG. 4. The session-related metadata carried in the session description protocol (SDP) may carry the device orientation information for the streamed content.

In the PSS service, the client can send the device orientation information in a RTSP DESCRIBE message to the server. The RTSP DESCRIBE message may also include a default device orientation attribute, indicating the device orientation in the absence of any further signaling from the client. If the current device orientation is different from the default device orientation, this difference may be signaled as a temporary adjustment based on ProfDiff signaling. In an example, PSS content servers supporting capability exchange can also receive device orientation information from the client in the HTTP and RTSP requests.

Figure 5:
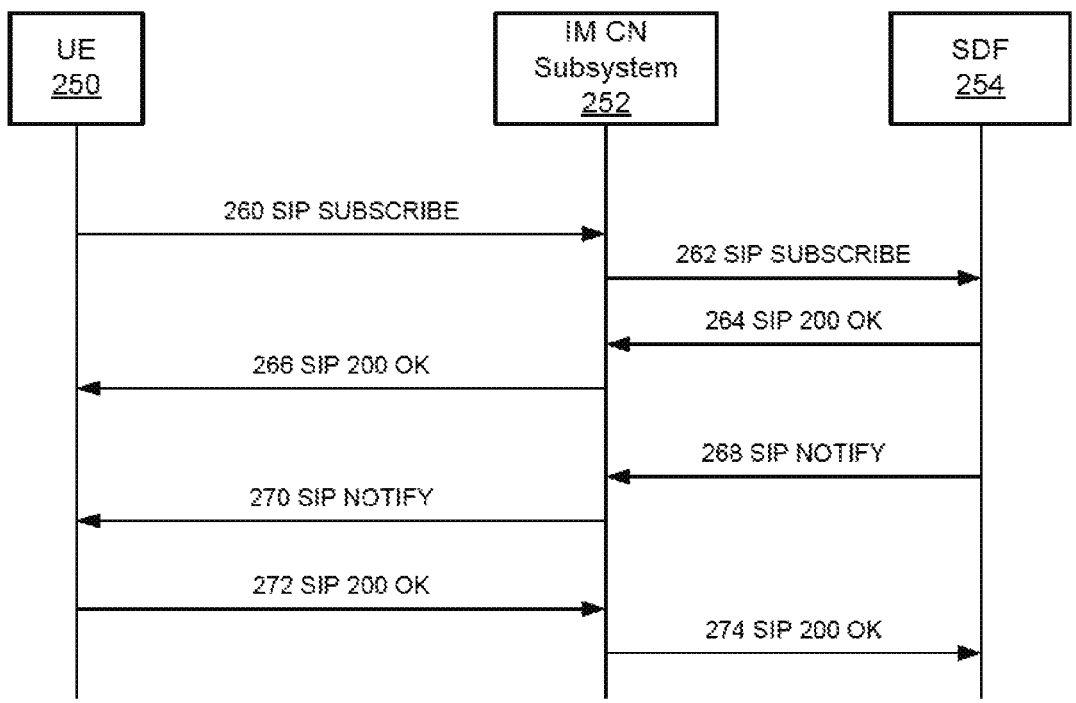
FIG. 5 illustrates an example service discovery with subscribe and notify for an integrated multimedia subsystem (IMS) based packet switched streaming service (PSS) and multimedia broadcast and multicast service (MBMS) (abbreviated as IMS_PSS_MBMS) service in accordance with an example.

In the IMS_PSS_MBMS service, the client (e.g., UE 250) can send device orientation information in a SIP SUBSCRIBE message 260 to an Internet protocol (IP) multimedia (IM) core network (CN) subsystem (IM CN subsystem) 252 during service discovery, as illustrated in FIG. 5, which can then forward the SIP SUBSCRIBE message 262 to a service discovery function (SDF) 254. The SIP SUBSCRIBE message can also include a default device orientation attribute, indicating the device orientation in the absence of any further signaling from the client. The SDF can determine proper service discovery information (e.g., according to the UE capabilities or the user's profile (e.g., personalized service discovery)). The SDF can acknowledge the SIP SUBSCRIBE message to the IM CN subsystem via a SIP 200 OK message 264, and the IM CN subsystem can forward the SIP 200 OK message 266 to the UE.

The SDF 254 can generate and/or provide the service attachment information and/or provide personalized service discovery. The IM CN subsystem 252 can support, user registration and authentication, mobility and roaming, control of multimedia sessions, quality of service (QoS) control, policy control, charging, and interworking with circuit switched systems.

The SDF 254 can send a SIP NOTIFY message 268 to the UE 250 with service discovery information to the IM CN subsystem 252, which relays the SIP NOTIFY message 270 back to the UE. The UE can acknowledge the SIP NOTIFY message to the IM CN subsystem via a SIP 200 OK message 272, and the IM CN subsystem can forward the SIP 200 OK message 274 to the SDF. In an example, using the SDF and IM CN subsystem framework can enable optimized service discovery utilizing the device orientation information in PSS and MBMS user services. Later in an IMS session, the UE may also use SIP signaling to indicate updates including any temporary adjustments to the device orientation based on ProfDiff (e.g., if the current device orientation is different from the default device orientation), which can be performed by refreshing a subscription through further SIP SUBSCRIBE messages. The SIP SUBSCRIBE messages can include information on the updates to the device orientation information.

New attributes can be added in PSS vocabulary device capability exchange signaling. For instance, attributes "Orientation" and "DefaultOrientation" (or attributes with similar functionality) can be included in the PSSCommon component of the PSS base vocabulary in TS 26.234. The attributes can have a name, definitions, an associated component, a type, legal values (or valid options), and a resolution rule.

In an example, a context for "Orientation" and "DefaultOrientation" can be define as follows:

| | |
|---|---|
| Attribute name: | Orientation |
| Attribute definition: | List of different device orientation states supported by the client. |
| Component: | PssCommon |
| Type: | Literal (Bag) |
| Legal values: | "Portrait", "Landscape", "Seascape" and so forth. |
| Resolution rule: | Append |
| EXAMPLE: | <Orientation><br><rdf:Bag><br><rdf:li>Portrait</rdf:li><rdf:li>Landscape</rdf:li><br><rdf:li>Seascape</rdf:li><br></rdf:Bag><br></Orientation> |
| Attribute name: | DefaultOrientation |
| Attribute definition: | Default device orientation to be taken as reference for content production/selection. |
| Component: | PssCommon |
| Type: | Literal |
| Legal values: | "Portrait", "Landscape", "Seascape" and so forth. |
| Resolution rule: | Locked |
| EXAMPLE: | <DefaultOrientation>Landscape</DefaultOrientation> |

In another example, identifying potential differences in terms of device orientation-awareness during capture and rendering and/or display can also be efined for the PSSCommon component of the PSS vocabulary. Two attributes can include the list of different device orientation modes supported by the client for capturing and display (e.g., "OrientationModesCapture" and "OrientationModesDisplay"), and two attributes can include the list of the default device orientation for capturing and display (if the orientation sensor is disabled or not present) (e.g., "DefaultOrientationCapture" and "DefaultOrientationDisplay"). A possible syntax for such attributes can be as follows:

| | |
|---|---|
| Attribute name: | OrientationModesCapture |
| Attribute definition: | List of different device orientation modes supported by the client for capturing. |
| Component: | PssCommon |
| Type: | Literal (Bag) |
| Legal values: | "Portrait", "Landscape", "Seascape" |
| Resolution rule: | Append |
| EXAMPLE: | <OrientationModesCapture><br><rdf:Bag><br><rdf:li>Portrait</rdf:li><br><rdf:li>Landscape</rdf:li><br></rdf:Bag><br></OrientationModesCapture> |
| Attribute name: | OrientationModesDisplay |
| Attribute definition: | List of different device orientation modes supported by the client for rendering and display. |
| Component: | PssCommon |
| Type: | Literal (Bag) |
| Legal values: | "Portrait", "Landscape","Seascape" |
| Resolution rule: | Append |
| EXAMPLE: | <OrientationModesDisplay><br><rdf:Bag><br><rdf:li>Portrait</rdf:li><br><rdf:li>Landscape</rdf:li><br></rdf:Bag><br></OrientationModesDisplay> |
| Attribute name: | DefaultOrientationCapture |
| Attribute definition: | Default device orientation for capturing based on the installation of the camera sensor (if orientation sensor is disabled or not present). |
| Component: | PssCommon |
| Type: | Literal |
| Legal values: | "Portrait", "Landscape", "Seascape". |
| Resolution rule: | Locked |
| EXAMPLE: | <DefaultOrientationCapture>Landscape</DefaultOrientationCapture> |
| Attribute name: | DefaultOrientationDisplay |
| Attribute definition: | Default device orientation for rendering and display (if orientation sensor is disabled or not present) |
| Component: | PssCommon |
| Type: | Literal |
| Legal values: | "Portrait", "Landscape", "Seascape". |
| Resolution rule: | Locked |
| EXAMPLE: | <DefaultOrientationDisplay>Landscape</DefaultOrientationDisplay> |

In another configuration, a set of orientation modes may also include further modes that enable rotation of images with angles smaller than 90 degrees based on the orientation changes of the device. When the angles are smaller than 90 degrees, the "OrientationModesCapture" and "OrientationModesDisplay" attributes defined above (or attributes with similar functionality) may also include additional legal values on the orientation modes that realize such rotations of images in a more granular fashion.

In another example, two additional attributes (e.g., "OrientationAngularGranularityCapture" and "OrientationAngularGranularityDisplay") may be used to characterize the capabilities of the device sensor and orientation awareness of the device with respect to the angular granularity by which the device sensor can detect orientation changes during capture or rendering/display. For example, two such attributes may be defined as follows:

| | |
|---|---|
| Attribute name: | OrientationAngularGranularityCapture |
| Attribute definition: | Number of equally-spaced angular granularity levels in a 90 degree interval at which the device sensor can detect orientation changes during capture |
| Component: | PssCommon |

| | |
|---|---|
| Type: | Number |
| Legal values: | Integer values between 1 and 8 |
| Resolution rule: | Locked |
| EXAMPLE: | <OrientationAngularGranularityCapture>2</OrientationAngularGranularityCapture> |
| Attribute name: | OrientationAngularGranularityDisplay |
| Attribute definition: | Number of equally-spaced angular granularity levels in a 90 degree interval at which the device sensor can detect orientation changes during rendering and display |
| Component: | PssCommon |
| Type: | Number |
| Legal values: | Integer values between 1 and 8 |
| Resolution rule: | Locked |
| EXAMPLE: | <OrientationAngularGranularityDisplay>2</OrientationAngularGranularityDisplay> |

In the examples above for "OrientationAngularGranularityCapture" and "OrientationAngularGranularityDisplay", the highest possible angular granularity for detection of orientation changes was assumed to be 11.25 degrees, and hence the attribute value was limited to integer values between 1 and 8. In other examples, higher levels of granularity may be enabled by more advanced orientation sensor capabilities, so the attribute can use higher integer values.

In another configuration, a single attribute (e.g., "OrientationAngularGranularityDisplay") may be used to characterize the orientation awareness of the device with respect to the angular granularity at which the device sensor can detect orientation changes so the attribute can be valid for both capture and rendering/display. In such a setting, the additional attribute may be defined as follows:

| | |
|---|---|
| Attribute name: | OrientationAngularGranularityDisplay |
| Attribute definition: | Number of equally-spaced angular granularity levels in a 90 degree interval at which the device sensor can detect orientation changes during both capture and rendering/display |
| Component: | PssCommon |
| Type: | Number |
| Legal values: | Integer values between 1 and 8 |
| Resolution rule: | Locked |
| EXAMPLE: | <OrientationAngularGranularity>8</OrientationAngularGranularity> |

In another example, another attribute (e.g, "NumOfCameras") may be defined to identify the number of capture cameras on the client device (e.g., mobile terminal). A value of more than one can indicate that the client device has both a front-facing and a back-facing camera, which can be beneficial for orientation-aware adaptations. For the example illustrated by "NumOfCameras" attribute, the maximum number of cameras is assumed as four. Other examples and numbers of cameras may also be possible.

| | |
|---|---|
| Attribute name: | NumOfCameras |
| Attribute definition: | Number of cameras on the device |
| Component: | PssCommon |
| Type: | Number |
| Legal values: | Integer values between 1 and 4 |
| Resolution rule: | Locked |
| EXAMPLE: | <NumOfCameras>2</NumOfCameras> |

In another configuration, another attribute (e.g., "HorizontalMirroringSupport") may be defined to indicate whether the device supports horizontal mirroring (e.g., horizontal flipping of image after rotation). This additional attribute can allow some devices to capture a horizontally-mirrored image due to sensor configuration. For instance, based on the capability exchange signaling for horizontal mirroring, when the server determines that a receiving client device supports horizontal mirroring, the server can determine that the receiving client device has mirroring and can compensate for horizontal mirroring. An example of a horizontal mirroring attribute can be as follows:

| | |
|---|---|
| Attribute name: | HorizontalMirroringSupport |
| Attribute definition: | If the device is orientation-aware, this attribute indicates whether it also supports horizontal mirroring, i.e., flipping of image after rotation based on sensor configuration. |
| Component: | PssCommon |
| Type: | Literal |
| Legal values: | "Yes", "No" |
| Resolution rule: | Locked |
| EXAMPLE: | <HorizontalMirroringSupport>No</HorizontalMirroringSupport> |

The technology described provides streaming or download of content with oriented video components. Device orientation-aware multimedia adaptations provide streaming or download of previously captured and uploaded content with oriented video components. For example, as part of a PSS download or MBMS download application, the server may push captured content with oriented video components to the client in a non-real time fashion for later playback. Or as part of a DASH-based streaming service, an HTTP server may deliver user-generated content (UGC) to DASH clients that may contain oriented video components. For a RTP-based streaming of UGC content may be delivered from PSS servers. In these contexts, the server may receive information on the video orientation capabilities supported by the client device and determine an optimal delivery strategy (e.g., select the most suited content version among various stored content versions and/or dynamically transcode the content) based on the video orientation capabilities of the terminal and deliver the optimally chosen content to the client.

For example, if the server determines that the content was captured by an orientation-aware terminal (e.g., through the inspection of the 3GP-based content file), while the receiving client device is not orientation-aware (e.g., known based on PSS device capability signaling mechanisms), the server may process (e.g., apply transcoding to) the content to correct and avoid misalignment problems during later rendering and display. If the receiving client device is orientation-aware, then the server may not have to correct the misalignment, but instead can choose to send the content "as is" along with video orientation information embedded in the content (e.g., in an RTP extension header for RTP streaming or inside a 3GP file for HTTP streaming and DASH) so that the receiving client device can correct the misalignment.

FIG. 6 illustrates an example server-client interaction realizing orientation-aware media delivery based on reception of content with embedded video orientation information. For example, a capturing client 224 can capture video orientation information with the capture and upload the content (e.g., 3GP file) with embedded video orientation information 282 to the server 232. In another example, a rendering client 226 can signal a device profile to the server with video orientation capability information 280. The server can perform orientation-processing to correct potential misalignment at the rendering client 284, as previously described. The server can then deliver adapted content to the rendering client as part of a streaming or download service 286.

Figure 7:
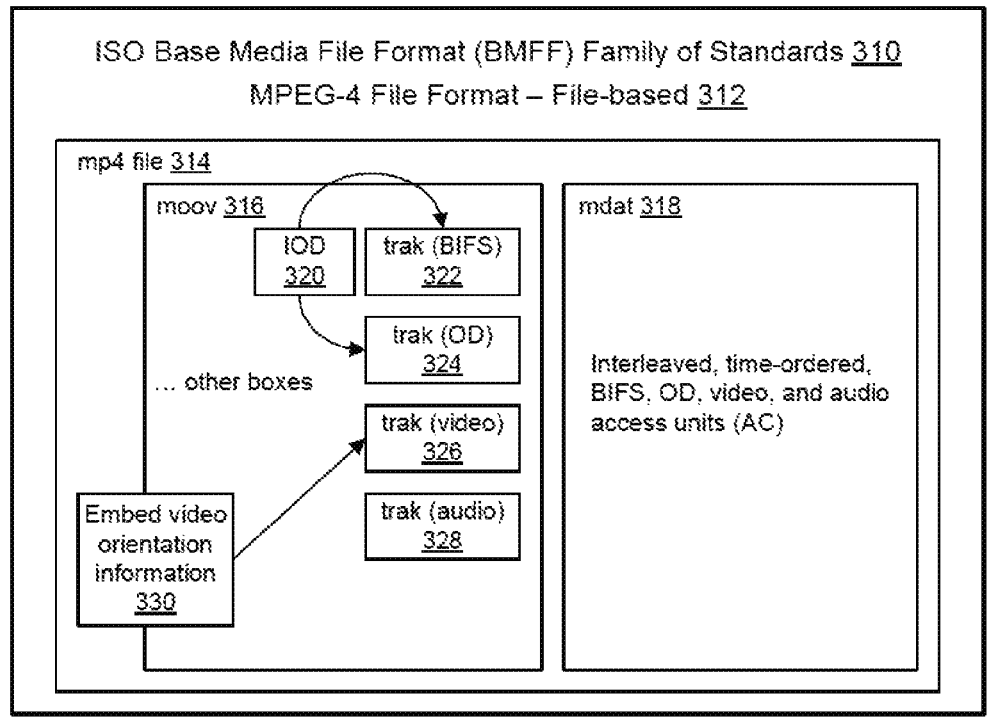
FIG. 7 illustrates an example of embedding video orientation information in a third generation partnership project (3GPP) file format (3GP) file using an instantiation of the International Organization for Standardization-base (ISO-base) media file format (ISO-BMFF) in accordance with an example.

The technology described herein can also embed video orientation information into the captured content, such as a 3GP file. Embedding video orientation information in a 3GP file (as described in 3GPP technical specification (TS) 26.244 V11.1.0 (2012-09); e.g., mp4 file 314 in a moving picture experts group-4 (MPEG-4) file format 312) as an instantiation of an International Organization for Standardization (ISO) Base Media File Format (BMFF) 310 for later use by servers as part of streaming and download applications can be beneficial, as illustrated in FIG. 7. The inclusion of such video orientation information in the 3GP file can better enable the server to perform orientation-aware multimedia adaptation for optimizing content delivery to devices (e.g., correcting the video to avoid misalignment problems prior to sending to an orientation-unaware device). The embedded video orientation information can be provided in device orientation capability attributes in the PSS vocabulary and device capability signaling framework. The content file (e.g., mp4 file 314) can include an initialization segment, such as a "moov" box 316, and media data (mdat 318). The moov box can include initial object descriptor (IOD) 320, a Binary Format for Scene (BIFS) trak 322, an object descriptor (OD) trak, a video trak 326, and an audio trak 328. The embedded video orientation information 330 can be included in the video trak (or track). The mdat can include Interleaved, time-ordered, BIFS, OD, video, and audio access units (AC).

FIG. 8 illustrates an example server-client interaction realizing orientation-aware media delivery based on reception of content with embedded video orientation information. For example, a capturing client 224 can capture video orientation information with the capture and upload the content (e.g., 3GP file) with embedded video orientation information 282 to the server 232. In another example, a rendering client 226 can signal a device profile to the server with video orientation capability information 280. Server performs orientation-aware content adaptation, selection, transcoding and/or format conversations to correct potential misalignment and optimize content delivery with respect to (w.r.t.) the orientation capabilities of the rendering client 294, as previously described. The server can then deliver adapted content to the rendering client as part of a streaming or download service 286.

Figure 9:
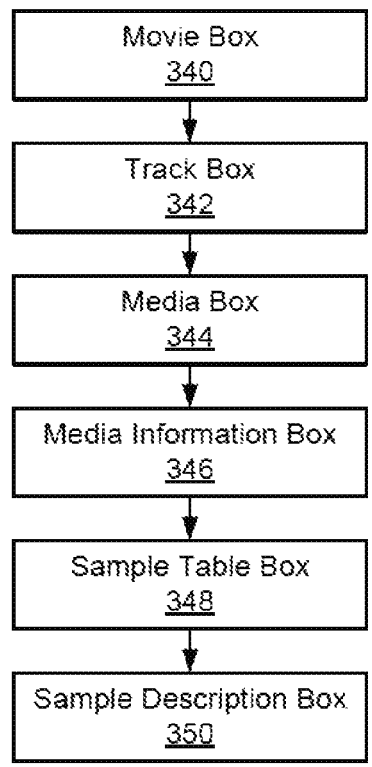
FIG. 9 illustrates an International Organization for Standardization (ISO) file format box structure hierarchy in accordance with an example.

Accordingly, in an example, the inclusion of video orientation information can be logged within a 3GP file format as a continuous recording of a series of orientation values of the images captured. A box can be defined in the ISO base media file format (ISO-BMFF) or the 3GPP file format for timed video orientation information. For instance, the video track or the RTP hint track of the 3GPP file format (3GP) may be used to embed the orientation information. For content formatted based on DASH, the video orientation information may be carried within a file-level ISO-BMFF box, such as in initialization segment (e.g., in a "moov" box for ISO-BMFF) or in media segments (e.g., in a 'moof' box for ISO-BMFF), as illustrated in FIG. 7. In another example, the timed metadata track of the ISO-BMFF may be chosen as the track to contain the video orientation information. For instance, a new box can be created specifically for video orientation that extends MetaDataSampleEntry with a description of the video orientation parameters. Other boxes within the sample description box 350 in the ISO file format box structure hierarchy, as shown in FIG. 9, may also be used to contain the video orientation information, which can include MP4VisualSampleEntry, AVCSampleEntry, or HintSampleEntry. The ISO file format box structure hierarchy can include a movie box 340, a track box 342, a media box 344, a media information box 346, a sample table box 348, and the sample description box, where higher order boxes are listed first.

In another configuration, the video orientation information may support 90 degrees granularity, the flip-bit (e.g., for horizontal flip) as also supported by GSM (global system for communications, originally groupe special mobile) association's (GSMA's) rich communication services (RCS) 5.1 profile, and the camera-bit (to signal front-versus-back-facing camera) as in RCS 5.1. For example, the video orientation information (e.g., set of orientations of the captured images) may be carried as a byte formatted as follows (consistent with the adopted format in 3GPP technical specification (TS) 26.114 V11.5.0 (2012-09)):

| Bit# | 7(MSB) | 6 | 5 | 4 | 3 | 2 | 1 | 0(LSB) |
|---|---|---|---|---|---|---|---|---|
| Definition | R | R | R | R | C | F | R1 | R0 |

With the following definitions: R=Reserved, where the reserved bits can be set to zero and can be reserved for future use. C=Camera, which indicates the direction of the camera used for the video stream (e.g., 0 can indicate a front-facing camera, facing the user, and if camera direction is unknown then zero can be is used; 1 can indicate a back-facing camera, facing away from the user). F=Flip, which indicates a horizontal (left-right flip) mirror operation on the video as sent on the link (e.g., 0 can indicate no flip operation, and 1 can indicate a horizontal flip operation). R1, R0=Rotation, which indicates the rotation of the video as transmitted on the link, as shown in Table 1 for rotation signaling. An orientation-aware receiver can rotate the video to compensate that rotation (e.g., a 90° counter clockwise rotation can be compensated by the receiver (e.g., rendering client device) with a 90° clockwise rotation prior to displaying). Alternatively, the video may be rotated by a server prior to transmission to an orientation-unaware client receiver (e.g., rendering client device). In another example, other definitions may be used.

TABLE 1

| R1 | R0 | Rotation of the video as sent on the link | Rotation on the receiver before display |
|---|---|---|---|
| 0 | 0 | 0° rotation | None |
| 0 | 1 | 90° Counter Clockwise (CCW) rotation or 270° Clockwise (CW) rotation | 90° CW rotation |
| 1 | 0 | 180° CCW rotation or 180° CW rotation | 180° CW rotation |
| 1 | 1 | 270° CCW rotation or 90° CW rotation | 90° CCW rotation |

Figure 10:
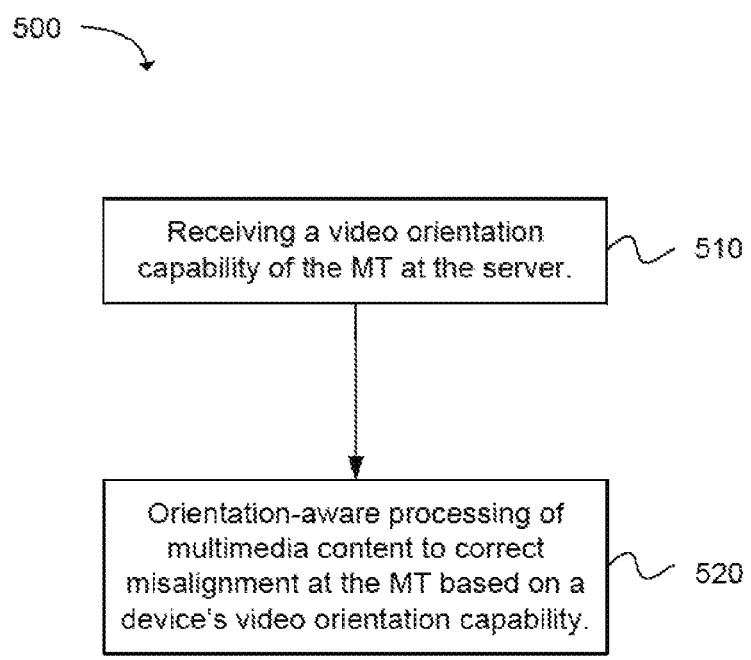
FIG. 10 depicts a flow chart of a method for multimedia adaptation at a server based on device orientation of a mobile terminal (MT) in accordance with an example.

Another example provides a method 500 for multimedia adaptation at a server based on device orientation of a mobile terminal (MT), as shown in the flow chart in FIG. 10. The method may be executed as instructions on a machine or computer circuitry, where the instructions are included on at least one computer readable medium or one non-transitory machine readable storage medium. The method includes the operation of receiving a video orientation capability of the mobile terminal (MT) at the server, as in block 510. The next operation of the method can be orientation-aware processing of multimedia content to correct misalignment at the MT based on a device's video orientation capability, as in block 520.

In an example, the method can further include: instructing the MT to capture video as a continuous recording of a series of video orientation values of the captured images; and instructing the MT to embed timed video orientation information in a third generation partnership project (3GPP) file format (3GP) file or an instantiation of an International Organization for Standardization (ISO) base media file format (ISO-BMFF) file. The video orientation information can be embedded in: a video track or real-time transport protocol (RTP) hint track of the 3GP file; a file-level ISO-BMFF box, wherein the file-level ISO-BMFF box is a 'moov' box initialization segment or a 'moof' box media segment; a timed metadata track of the ISO-BMFF; or a SampleEntry with video orientation parameters within the sample description box in an ISO file format box structure. The video orientation information can include rotation bits to support 90 degrees of granularity, a flip bit for horizontal flip, or a camera bit to indicate a front or back camera direction in a global system for mobile communications (GSM) association (GSMA) rich communication services (RCS) 5.1 profile. In another example, the operation of instructing the MT to capture video can further include: instructing the MT to capture and compress multiple copies or orientations of the captured video.

In another configuration, the operation of orientation-aware processing can further include: selecting a content version of captured content from multiple stored content versions based on the device's video orientation capability, or dynamically transcoding or converting captured content based on the device's video orientation capability; and pushing the captured content with oriented video components in a packet switched streaming service (PSS) real-time transport protocol (RTP) streaming, a PSS download, or a multimedia broadcast and multicast service (MBMS) download, or dynamically delivering the captured content with oriented video components in a hypertext transfer protocol (HTTP) stream, a dynamic adaptive streaming over HTTP (DASH) stream, a real-time transport protocol (RTP) stream, or a real time streaming protocol (RTSP) indicating the presence of video orientation information in a session description protocol (SDP) file and indicating the corresponding video orientation information in a RTP extension header for the RTP stream.

Figure 11:
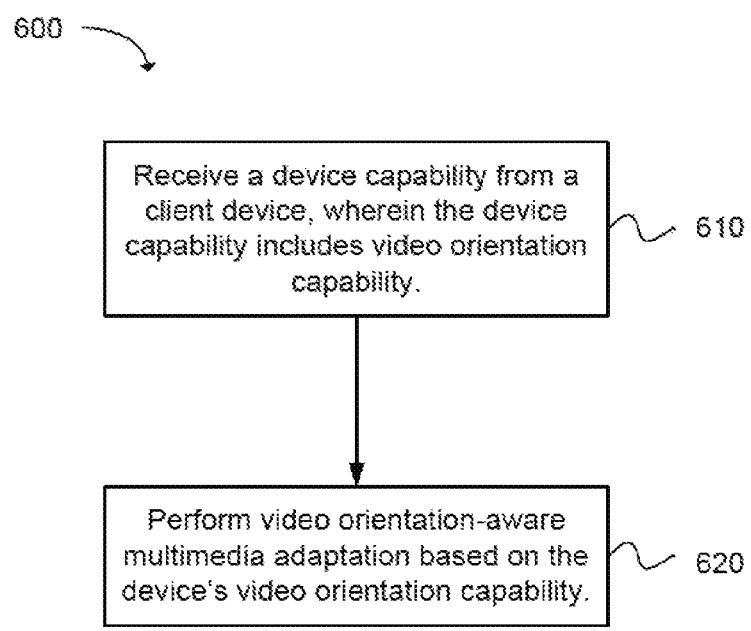
FIG. 11 depicts functionality of computer circuitry of a server operable for multimedia adaptation based on video orientation in accordance with an example.

Another example provides functionality 600 of computer circuitry of a server operable for multimedia adaptation based on video orientation, as shown in the flow chart in FIG. 11. The functionality may be implemented as a method or the functionality may be executed as instructions on a machine, where the instructions are included on at least one computer readable medium or one non-transitory machine readable storage medium. The computer circuitry can be configured to receive a device capability from a client device, wherein the device capability includes video orientation capability, as in block 610. The computer circuitry can be further configured to perform video orientation-aware multimedia adaptation based on the device's video orientation capability, as in block 620.

In an example, the computer circuitry can be further configured to override a client device's default video orientation capability information when an updated video orientation capability is received from the client device via a profile difference (Profdiff) signaling. In another example, the computer circuitry configured to perform video orientation-aware multimedia adaptation can be further configured to perform orientation-aware content adaptation, orientation-aware content selection, orientation-aware transcoding, or orientation-aware format conversion to correct video orientation misalignment and ensure content playback at the client device with a correct video orientation.

In another configuration, the computer circuitry can be further configured to deliver orientation-aware adapted content to the client device via a streaming service or a download service based on the client device's video orientation capability. The orientation-aware adapted content can include a media presentation description (MPD) metadata file with different encoded content according to the client device's video orientation capability for a hypertext transfer protocol (HTTP) stream or dynamic adaptive streaming over HTTP (DASH). The orientation-aware adapted content can include a session description protocol (SDP) file indicating the presence of oriented video components in a corresponding RTP stream and an RTP header extension indicating a current video orientation information for a real-time transport protocol (RTP) stream.

In another example, the computer circuitry configured to perform video orientation-aware multimedia adaptation can be further configured to dynamically transcode or convert multimedia content of the a hypertext transfer protocol (HTTP) stream, dynamic adaptive streaming over HTTP (DASH), or real-time transport protocol (RTP) stream to a different video orientation when the device capability for the client device does not include orientation-aware processing capabilities. Or, the computer circuitry configured to perform video orientation-aware multimedia adaptation can be further configured to embed video orientation indication information in a media presentation description (MPD) metadata file or a session description protocol (SDP) file when device orientation capability for the client device indicates video orientation-aware processing capabilities so the client device can activate a video orientation processing engine on the client device and obtain the video orientation indication information in an in-band media stream. Or, the computer circuitry configured to perform video orientation-aware multimedia adaptation can be further configured to embed video orientation information in an instantiation of an International Organization for Standardization (ISO) base media file format (ISO-BMFF) file or a real-time transport protocol (RTP) extension header when device orientation capability for the client device indicates video orientation-aware processing capabilities so the client device can modify the display orientation of the multimedia content.

In another configuration, the computer circuitry configured to receive the device capability can be further configured to receive a video orientation attribute via a packet switched streaming service (PSS) device capability exchange signaling. The video orientation attribute can be a PSS common component that includes: an Orientation attribute selected from a list of different video orientation modes supported by the client device, a DefaultOrientation attribute that provides a default video orientation to be taken as reference for a content production or selection, an OrientationModesCapture attribute selected from a list of different video orientation modes supported by the client device for a capturing, an OrientationModesDisplay attribute selected from a list of different video orientation modes supported by the client device for a rendering and a display, a DefaultOrientationCapture attribute that provides a default video orientation for capturing based on the installation of the camera sensor if an orientation sensor is disabled or not present, a DefaultOrientationDisplay attribute that provides a default video orientation for rendering and display if the orientation sensor is disabled or not present, an OrientationAngularGranularityCapture attribute selected from a number of equally-spaced angular granularity levels in a 90 degree interval at which a device sensor can detect video orientation changes during the capture, an OrientationAngularGranularityDisplay attribute selected from a number of equally-spaced angular granularity levels in the 90 degree interval at which the device sensor can detect video orientation changes during the rendering and the display or both the capture and the rendering and display, a NumOfCameras attribute selected from a number of cameras on a device, or a HorizontalMirroringSupport attribute to indicate whether the device supports horizontal mirroring when the device is orientation-aware.

In another example, the computer circuitry can be further configured to instruct the client device to capture and compress video segments for different device orientations; and instruct the client device to embed video orientation information in a third generation partnership project (3GPP) file format (3GP) file or an instantiation of an International Organization for Standardization (ISO) base media file format (ISO-BMFF) file. The video orientation information can be embedded in: a video track or real-time transport protocol (RTP) hint track of the 3GP file; a file-level ISO-BMFF box, wherein the file-level ISO-BMFF box is a 'moov' box initialization segment or a 'moof' box media segment; a timed metadata track of the ISO-BMFF; or a SampleEntry with video orientation parameters within the sample description box in an ISO file format box structure.

In another configuration, the server can include a third generation partnership project (3GPP) long term evolution (LTE) packet switched streaming service (PSS) server, a dynamic adaptive streaming over hypertext transfer protocol (HTTP) (DASH) server, or an integrated multimedia subsystem (IMS) based PSS and multimedia broadcast and multicast service (MBMS) (IMS_PSS_MBMS) server.

Figure 12:
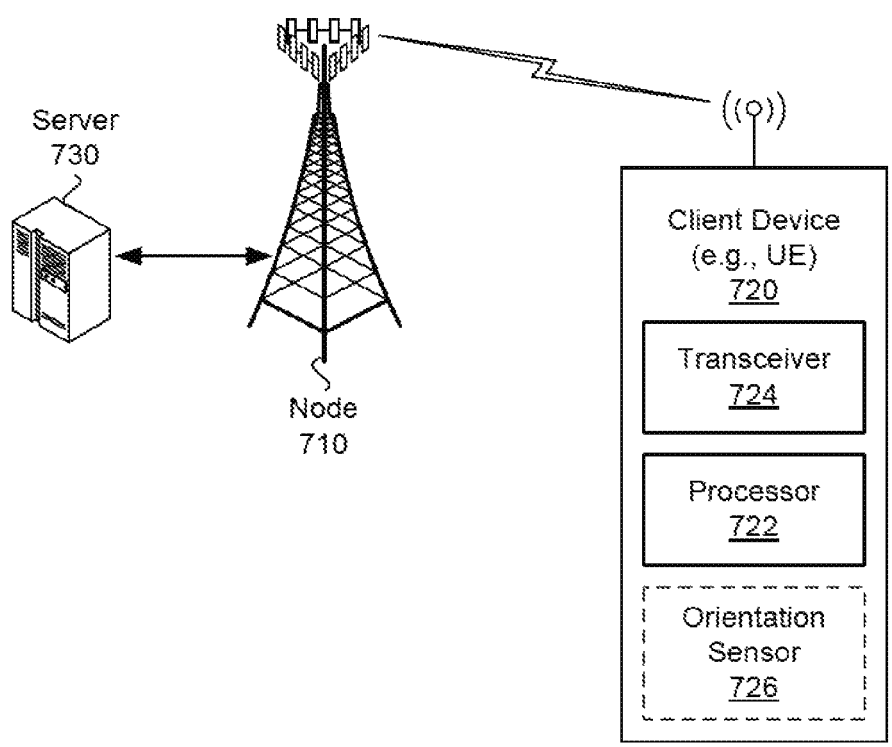
FIG. 12 illustrates a diagram of a server, a node, and a user equipment (UE) in accordance with an example.

FIG. 12 illustrates an example client device for providing orientation-aware processing capability 720, a node 710, and a server 730. The server can be configured for multimedia adaptation on device orientation of a mobile terminal (MT), as described in 500 of FIG. 10. In another configuration, the server can be operable for multimedia adaptation based on video orientation, as described in 600 of FIG. 11. The node 710 can include a base station (BS), a Node B (NB), an evolved Node B (eNB), a baseband unit (BBU), a remote radio head (RRH), a remote radio equipment (RRE), a remote radio unit (RRU), or a central processing module (CPM).

Referring back to FIG. 12, the client device 720 can include a processor 722, a transceiver 724, and an orientation sensor 726. The processor can be configured for determining a video orientation capability. The transceiver can be configured to transmit video orientation capability information to the server.

In an example, a client device's current video orientation capability information can override a default video orientation capability information via profile difference (Profdiff) signaling. The processor 722 can be configured to: capture video with a specified video orientation for a specified media segment based on a device orientation; and embed video orientation information for the captured video in a third generation partnership project (3GPP) file format (3GP) file as an instantiation of an International Organization for Standardization (ISO) base media file format (ISO-BMFF) file. The video orientation information can be embedded in: a video track or real-time transport protocol (RTP) hint track of the 3GP file; a file-level ISO-BMFF box, wherein the file-level ISO-BMFF box is a 'moov' box initialization segment or a 'moof' box media segment; a timed metadata track of the ISO-BMFF; or a SampleEntry with video orientation parameters within the sample description box in an ISO file format box structure. In another example, the video orientation information can include rotation bits to support 90 degrees of granularity, a flip bit for horizontal flip, or a camera bit to indicate a front or back camera direction in a global system for mobile communications (GSM) association (GSMA) rich communication services (RCS) 5.1 profile. The transceiver 722 can be further configured to upload the 3GP file for a hypertext transfer protocol (HTTP) stream or dynamic adaptive streaming over HTTP (DASH).

In another configuration, the transceiver 722 can be further configured to transmit a video orientation attribute via a packet switched streaming service (PSS) device capability exchange signaling. The video orientation attribute can be a PSS common component that includes: an Orientation attribute selected from a list of different video orientation states supported by the client, a DefaultOrientation attribute that provides a default video orientation to be taken as reference for a content production or selection, an OrientationModesCapture attribute selected from a list of different video orientation modes supported by the client for a capturing, an OrientationModesDisplay attribute selected from a list of different video orientation modes supported by the client for a rendering and a display, a DefaultOrientationCapture attribute that provides a default video orientation for capturing based on the installation of the camera sensor if an orientation sensor is disabled or not present, a DefaultOrientationDisplay attribute that provides a default video orientation for rendering and display if the orientation sensor is disabled or not present, an OrientationAngularGranularityCapture attribute selected from a number of equally-spaced angular granularity levels in a 90 degree interval at which a device sensor can detect video orientation changes during the capture, an OrientationAngularGranularityDisplay attribute selected from a number of equally-spaced angular granularity levels in the 90 degree interval at which the device sensor can detect video orientation changes during the rendering and the display or both the capture and the rendering and display, a NumOfCameras attribute selected from a number of cameras on a device, or a HorizontalMirroringSupport attribute to indicate whether the device supports horizontal mirroring when the device is orientation-aware.

In another example, the video orientation capability information can be provided in a third generation partnership project (3GPP) long term evolution (LTE) packet switched streaming service (PSS) session, a dynamic adaptive streaming over hypertext transfer protocol (HTTP) (DASH) session, or an integrated multimedia subsystem (IMS) based PSS and multimedia broadcast and multicast service (MBMS) (IMS_PSS_MBMS) session. In another configuration, the client device can include an orientation sensor 726 to determine an orientation of the client device.

In another example, the transceiver 724 can be further configured to receive a real-time transport protocol (RTP) extension header for a RTP stream, or receive a third generation partnership project (3GPP) file format (3GP) file for a hypertext transfer protocol (HTTP) stream or dynamic adaptive streaming over HTTP (DASH). The processor 722 can be further configured to: parse a media presentation description (MPD) metadata file to identify a presence of video orientation information in the 3GP file or parse the 3GP file for embedded video orientation information, determine an orientation correction term based on the parsed video orientation information and a current orientation of the client device, and correct a rendering orientation of the HTTP stream or DASH for misalignment based on the determined orientation correction term. Or, the processor can be further configured to: parse a session description protocol (SDP) file to identify a presence of video orientation information in the RTP stream or parse a RTP extension header for the RTP stream for the embedded video orientation information, determine the orientation correction term based on the parsed video orientation information and the current orientation of the client device, and correct a rendering orientation of the RTP stream for misalignment based on the determined orientation correction term. Correcting the rendering orientation can compensate for rotation or flip of the orientation.

Figure 13:
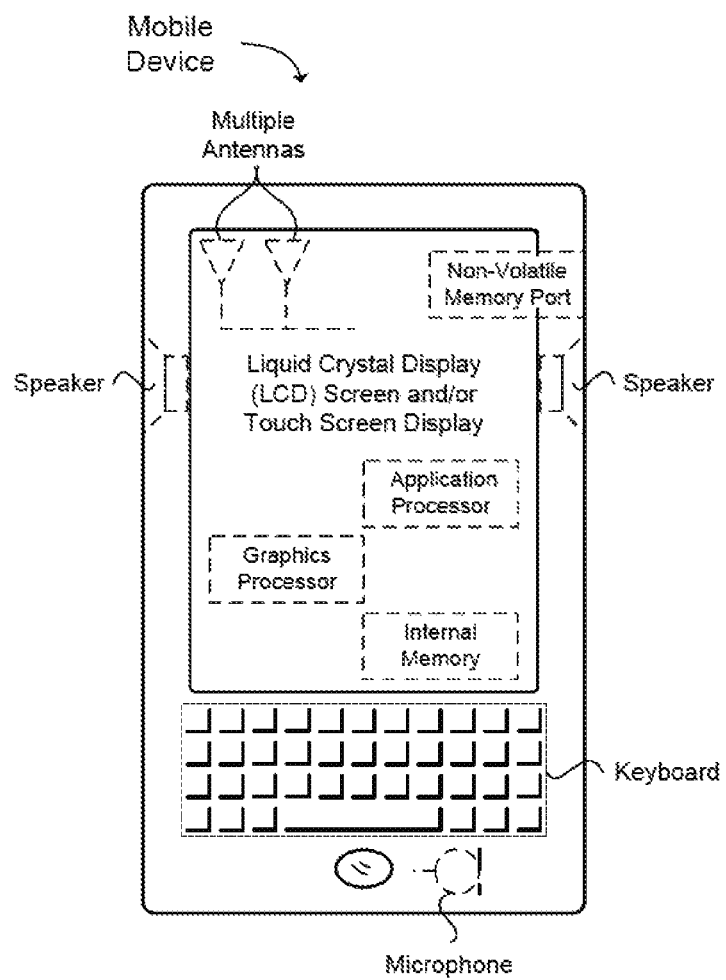
FIG. 13 illustrates a diagram of a wireless device (e.g., UE) in accordance with an example.

FIG. 13 provides an example illustration of the client device, such as a mobile terminal (MT), a mobile node, a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 13 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a mobile terminal (MT) operable to provide an orientation-aware processing capability, the apparatus comprising one or more processors and memory configured to:
   determine, at the MT, video orientation capability information for the MT;
   parse a media presentation description (MPD) metadata file to identify a presence of video orientation information in a third generation partnership (3GP) file or parse the 3GP file for the video orientation information;
   process, at the MT, the video orientation capability information for transmission to a server via a packet switched streaming service (PSS) device capability exchange signaling between the MT and the server; and
   access, at the MT, segments from the server via the PSS based on an orientation of the MT and the video orientation capability information for the MT.

2. The apparatus of a claim 1, further comprising a transceiver configured to:
   transmit the video orientation capability information to the server; and
   receive the segments from the server.

3. The apparatus of claim 1, wherein the one or more processors and memory are further configured to:
   determine an orientation correction term based on the video orientation information and a current orientation of the MT; and
   correct a rendering orientation of a real-time transport protocol (RTP) stream for misalignment based on the orientation correction term.

4. The apparatus of claim 1, wherein the one or more processors and memory are further configured to embed video orientation information for a captured video with a specified video orientation for a specified media segment in a third generation partnership project (3GPP) file format (3GP) file as an instantiation of an International Organization for Standardization (ISO) base media file format (ISO-BMFF) file.

5. The apparatus of claim 4, wherein the video orientation information is embedded in:
   a video track or real-time transport protocol (RTP) hint track of the 3GP file;
   a file-level ISO-BMFF box, wherein the file-level ISO-BMFF box is a 'moov' box initialization segment or a 'moof' box media segment;
   a timed metadata track of the ISO-BMFF; or
   a SampleEntry with video orientation parameters within a sample description box in an ISO file format box structure.

6. The apparatus of claim 4, wherein the one or more processors and memory are further configured to prepare the 3GP file to upload for a hypertext transfer protocol (HTTP) stream or dynamic adaptive streaming over HTTP (DASH).

7. The apparatus of claim 1, wherein the one or more processors and memory are further configured to process a video orientation attribute for transmission via the PSS device capability exchange signaling, wherein the video orientation attribute is a PSS common component that includes:
   an Orientation attribute selected from a list of different video orientation states supported by a client,
   a DefaultOrientation attribute that provides a default video orientation to be taken as reference for a content production or selection,
   an OrientationModesCapture attribute selected from a list of different video orientation modes supported by the client for a capturing,
   an OrientationModesDisplay attribute selected from a list of different video orientation modes supported by the client for a rendering and a display,
   a DefaultOrientationCapture attribute that provides a default video orientation for capturing based on an installation of a camera sensor if an orientation sensor is disabled or not present,
   a DefaultOrientationDisplay attribute that provides a default video orientation for rendering and display if the orientation sensor is disabled or not present,
   an OrientationAngularGranularityCapture attribute selected from a number of equally-spaced angular granularity levels in a 90 degree interval at which a device sensor can detect video orientation changes during the capture,
   an OrientationAngularGranularityDisplay attribute selected from a number of equally-spaced angular granularity levels in the 90 degree interval at which the device sensor can detect video orientation changes during the rendering and the display or both the capture and the rendering and display,
   a NumOfCameras attribute selected from a number of cameras on a device, or a HorizontalMirroringSupport attribute to indicate whether the device supports horizontal mirroring when the device is orientation-aware.

8. The apparatus of claim 1, wherein the one or more processors and memory are further configured to provide the video orientation capability information in a third generation partnership project (3GPP) long term evolution (LTE) packet switched streaming service (PSS) session, a dynamic adaptive streaming over hypertext transfer protocol (HTTP) (DASH) session, or an integrated multimedia subsystem (IMS) based PSS and multimedia broadcast and multicast service (MBMS) (IMS_PSS_MBMS) session.

9. The apparatus of claim 1, further comprising an orientation sensor operable to determine the orientation of the MT.

10. The apparatus of claim 1, wherein the one or more processors and memory are further configured to:
  process a real-time transport protocol (RTP) extension header received for a RTP stream, or a third generation partnership project (3GPP) file format (3GP) file received for a hypertext transfer protocol (HTTP) stream or dynamic adaptive streaming over HTTP (DASH);
  parse a media presentation description (MPD) metadata file to identify a presence of video orientation information in the 3GP file or parse the 3GP file for the video orientation information;
  determine an orientation correction term based on the video orientation information and the orientation of the MT; and
  correct a rendering orientation of the HTTP stream or DASH for misalignment based on the orientation correction term,
  wherein correcting the rendering orientation compensates for rotation or flip of the orientation of the MT.

11. The apparatus of claim 1, wherein the one or more processors and memory are further configured to:
  process a real-time transport protocol (RTP) extension header received for a RTP stream, or a third generation partnership project (3GPP) file format (3GP) file received for a hypertext transfer protocol (HTTP) stream or dynamic adaptive streaming over HTTP (DASH);
  parse a session description protocol (SDP) file to identify a presence of video orientation information in the RTP stream or parse a RTP extension header for the RTP stream for the video orientation information;
  determine an orientation correction term based on the video orientation information and the orientation of the MT; and
  correct a rendering orientation of the RTP stream for misalignment based on the orientation correction term,
  wherein correcting the rendering orientation compensates for rotation or flip of the orientation of the MT.

12. The apparatus of claim 1, wherein the one or more processors and memory are further configured to capture video with a specified video orientation for a specified media segment based on the orientation of the MT.

13. The apparatus of claim 1, wherein the video orientation capability information for the MT overrides a default video orientation capability information via profile difference (Profdiff) signaling.

14. The apparatus of claim 1, wherein the MT includes a client device, a user equipment (UE), or a mobile station (MS); and the MT includes an antenna, a camera, a touch sensitive display screen, a speaker, a microphone, a graphics processor, an application processor, an internal memory, or a non-volatile memory port.

15. An apparatus of a server operable to process an orientation-aware capability received from a mobile terminal (MT), the apparatus comprising one or more processors and memory configured to:
  process, at the server, video orientation capability information received from the MT via a packet switched streaming service (PS S) device capability exchange signaling between the server and the MT, wherein the video orientation capability information is for the MT; and
  process, at the server, segments for transmission to the MT via the PSS based on an orientation of the MT and the video orientation capability information received from the MT; and
  process a media presentation description (MPD) metadata file for transmission to the MT to enable the MT to parse the MPD metadata file to identify a presence of video orientation information in a third generation partnership (3GP) file or parse the 3GP file for the video orientation information.

16. The apparatus of a claim 15, further comprising a transceiver configured to:
  receive the video orientation capability information from the MT; and
  transmit the segments to the MT.

17. The apparatus of a claim 15, wherein the one or more processors and memory are configured to process a video orientation attribute received from the MT via the PSS device capability exchange signaling.

18. At least one non-transitory machine readable storage medium having instructions embodied thereon for providing an orientation-aware processing capability from a mobile terminal (MT), the instructions when executed by one or more processors cause the MT to perform the following:
  determining, at the MT, video orientation capability information for the MT;
  parsing a media presentation description (MPD) metadata file to identify a presence of video orientation information in a third generation partnership (3GP) file or parse the 3GP file for the video orientation information;
  processing, at the MT, the video orientation capability information for transmission to a server via a packet switched streaming service (PSS) device capability exchange signaling between the MT and the server; and
  accessing, at the MT, segments from the server via the PSS based on an orientation of the MT and the video orientation capability information for the MT.

19. The at least one non-transitory machine readable storage medium of claim 18, further comprising instructions which when executed perform the following:
  determining an orientation correction term based on the video orientation information and the orientation of the MT; and
  correcting a rendering orientation of a real-time transport protocol (RTP) stream for misalignment based on the orientation correction term.

20. The at least one non-transitory machine readable storage medium of claim 18, further comprising instructions which when executed perform the following: embedding video orientation information for a captured video with a specified video orientation for a specified media segment in a third generation partnership project (3GPP) file format (3GP) file as an instantiation of an International Organization for Standardization (ISO) base media file format (ISO-BMFF) file.

21. The at least one non-transitory machine readable storage medium of claim 20, wherein the video orientation information is embedded in:
   a video track or real-time transport protocol (RTP) hint track of the 3GP file;
   a file-level ISO-BMFF box, wherein the file-level ISO-BMFF box is a 'moov' box initialization segment or a 'moof' box media segment;
   a timed metadata track of the ISO-BMFF; or
   a SampleEntry with video orientation parameters within a sample description box in an ISO file format box structure.

22. The at least one non-transitory machine readable storage medium of claim 18, further comprising instructions which when executed perform the following: preparing the 3GP file to upload for a hypertext transfer protocol (HTTP) stream or dynamic adaptive streaming over HTTP (DASH).

23. The at least one non-transitory machine readable storage medium of claim 18, further comprising instructions which when executed perform the following: processing a video orientation attribute for transmission via the PSS device capability exchange signaling, wherein the video orientation attribute is a PSS common component that includes:
   an Orientation attribute selected from a list of different video orientation states supported by a client,
   a DefaultOrientation attribute that provides a default video orientation to be taken as reference for a content production or selection,
   an OrientationModesCapture attribute selected from a list of different video orientation modes supported by the client for a capturing,
   an OrientationModesDisplay attribute selected from a list of different video orientation modes supported by the client for a rendering and a display,
   a DefaultOrientationCapture attribute that provides a default video orientation for capturing based on an installation of a camera sensor if an orientation sensor is disabled or not present,
   a DefaultOrientationDisplay attribute that provides a default video orientation for rendering and display if the orientation sensor is disabled or not present,
   an OrientationAngularGranularityCapture attribute selected from a number of equally-spaced angular granularity levels in a 90 degree interval at which a device sensor can detect video orientation changes during the capture,
   an OrientationAngularGranularityDisplay attribute selected from a number of equally-spaced angular granularity levels in the 90 degree interval at which the device sensor can detect video orientation changes during the rendering and the display or both the capture and the rendering and display,
   a NumOfCameras attribute selected from a number of cameras on a device, or
   a HorizontalMirroringSupport attribute to indicate whether the device supports horizontal mirroring when the device is orientation-aware.

24. The at least one non-transitory machine readable storage medium of claim 18, further comprising instructions which when executed perform the following: providing the video orientation capability information in a third generation partnership project (3GPP) long term evolution (LTE) packet switched streaming service (PSS) session, a dynamic adaptive streaming over hypertext transfer protocol (HTTP) (DASH) session, or an integrated multimedia subsystem (IMS) based PSS and multimedia broadcast and multicast service (MBMS) (IMS_PSS_MBMS) session.

25. The at least one non-transitory machine readable storage medium of claim 18, further comprising instructions which when executed perform the following:
   processing a real-time transport protocol (RTP) extension header received for a RTP stream, or a third generation partnership project (3GPP) file format (3GP) file received for a hypertext transfer protocol (HTTP) stream or dynamic adaptive streaming over HTTP (DASH);
   parsing a media presentation description (MPD) metadata file to identify a presence of video orientation information in the 3GP file or parse the 3GP file for the video orientation information;
   determining an orientation correction term based on the video orientation information and the orientation of the MT; and
   correcting a rendering orientation of the HTTP stream or DASH for misalignment based on the orientation correction term,
   wherein correcting the rendering orientation compensates for rotation or flip of the orientation of the MT.

26. The at least one non-transitory machine readable storage medium of claim 19, further comprising instructions which when executed perform the following:
   processing a real-time transport protocol (RTP) extension header received for a RTP stream, or a third generation partnership project (3GPP) file format (3GP) file received for a hypertext transfer protocol (HTTP) stream or dynamic adaptive streaming over HTTP (DASH);
   parsing a session description protocol (SDP) file to identify a presence of video orientation information in the RTP stream or parse a RTP extension header for the RTP stream for the video orientation information;
   determining an orientation correction term based on the video orientation information and the orientation of the MT; and
   correcting a rendering orientation of the RTP stream for misalignment based on the orientation correction term,
   wherein correcting the rendering orientation compensates for rotation or flip of the orientation of the MT.

27. The at least one non-transitory machine readable storage medium of claim 18, further comprising instructions which when executed perform the following: capturing video with a specified video orientation for a specified media segment based on the orientation of the MT.

28. The at least one non-transitory machine readable storage medium of claim 18, wherein the video orientation capability information for the MT overrides a default video orientation capability information via profile difference (Profdiff) signaling.

* * * * *